Dec. 23, 1930.  C. P. HARRIS  1,786,111
FISHING TOOL
Filed Feb. 13, 1928
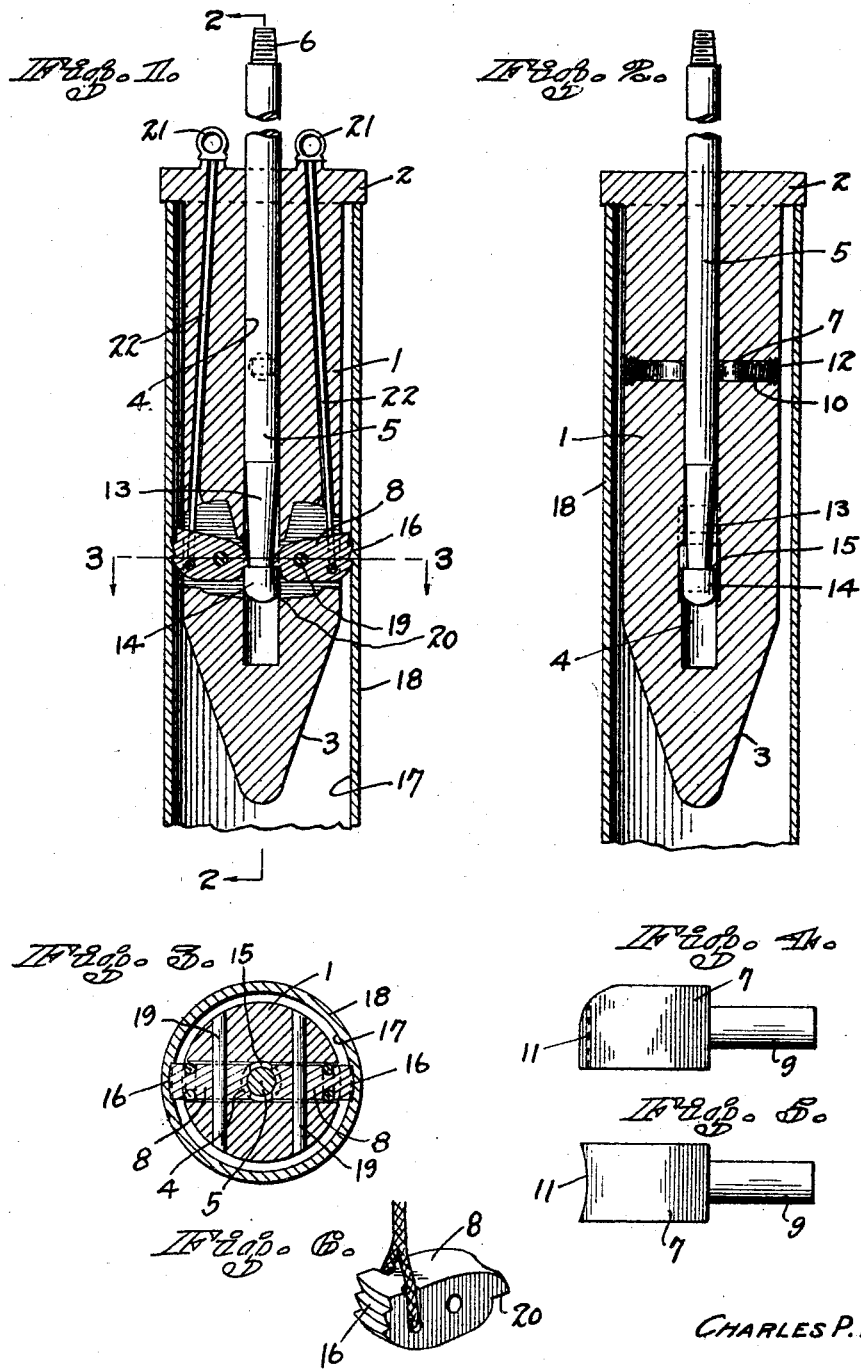
Inventor
CHARLES P. HARRIS Patented Dec. 23, 1930

1,786,111

UNITED STATES PATENT OFFICE

CHARLES P. HARRIS, OF OAKLAND, CALIFORNIA

FISHING TOOL

Application filed February 13, 1928. Serial No. 254,085.

My invention relates to improvements in fishing tools, and it consists in the combinations, constructions, and arrangements hereinafter described and claimed.

Many abandoned oil wells are partially lined or entirely lined with well casings, and these casings are left to rust away and otherwise deteriorate merely because no practical simple and inexpensive means has been devised for removing the sections of casing. Well casings cost between $2.00 and $3.00 a running foot, and it will be seen that the loss of money involved is enormous when considering the fact that many wells go down a few thousand feet before they are abandoned. It is the purpose of this invention to provide a simple device for removing well casing sections.

An object of my invention is to provide a fishing tool for removing well casing sections that may be dropped down to the desired point, and when reaching this point to automatically grip the well casing section, whereupon a lifting of the fishing tool will carry with it the casing. This operation can be repeated for each section until all of the sections have been removed.

A further object of my invention is to provide a device of the type described in which the fishing tool is supported by a stem, and when the tool comes to rest, further movement of the stem will bring casing-gripping jaws into play, whereupon a lifting of the stem will carry with it the tool and the casing.

Other objects and advantages will appear in the following specification, and the novel features of the device will be particularly pointed out in the appended claims.

My invention is illustrated in the accompanying drawing forming a part of this application, in which:

Figure 1 is a vertical section through the device showing the jaws engaging with a casing;

Figure 2 is a section along the line 2—2 of Figure 1;

Figure 3 is a section along the line 3—3 of Figure 1;

Figures 4 and 5 are side and top views of one of the catches; and

Figure 6 is a perspective view of one of the jaws.

In carrying out my invention, I provide a fishing tool that has a cylindrical-shaped body 1, a flanged end 2, and a conical-shaped end 3. The body has a central bore 4 for slidably receiving a stem 5. The stem 5 is provided with the usual tapered threaded end 6 for connection with standard sectional stems used in oil well drilling. By such a connection stem 5 provides a means for moving the body 1 or for moving the casing 18, and also acts as a supporting member of the body 1.

The tool carries a pair of catches 7 and a pair of jaws 8, the jaws being disposed at a lower point than the catches.

The catches are shown in Figures 2, 4, and 5, and they comprise a body portion having a reduced end 9 around which a spring 10 is disposed. The stem engaging end of the catch is made concave as in 11, and this concave portion receives the stem and permits sliding movement between the stem and the catch. Set screws 12 secure the catches in place, and the springs 10 bear against these screws and against the catches for urging the catches toward the stem or for preventing the withdrawal of the lifting stem 5 from the body 1.

The lower end of the stem has a tapered portion 13 and a head 14 forming a shoulder 15. When the stem 5 is raised with respect to the body 1, the catches 7 acting as a stop permit the stem to move until they strike the shoulder 15, whereupon further movement of the stem in the same direction will lift the tool. The catches 7 are for the purpose of permitting the entire removal of the stem from the body when desired.

The particular shape of jaw 8 is shown in Figure 6. There are two jaws, and each is provided with teeth 16 that are fashioned for biting into the inner wall 17 of a well casing 18. The teeth will grip the casing and a lifting of the tool will carry with it the casing. Pivot pins 19 secure the jaws 8 to the tool, and these pins are positioned for causing the teeth 16 to swing further away from the exterior surface of the tool as pressure is brought to bear upon the teeth by the casing 18. In this way the greater the force in lifting the casing the greater will be the digging effect of the teeth into the wall 17.

The opposite ends of the jaws are provided with hooks 20 that co-act with the shoulder 15 when the stem 5 is dropped into the position shown in Figure 1. A lifting of the stem in this instance will first swing the jaws into operative engagement before the lifting of the tool. In this way, a sure grip is provided upon the casing 18 prior to the lifting of the tool.

When it is desired to release the tool from the casing, it is merely necessary to drop the stem 5 to loosen the jaws and to pull upwardly upon handles 21. These handles are connected by cables 22 to the jaws, and will swing the jaws into inoperative position.

From the foregoing description of the various parts of the device, the operation thereof may be readily understood.

Assume that the section of casing 18 is disposed some distance down within the well. The tool is lowered and is supported by the stem. The teeth of the jaws 8 will ride over the casing to be removed without affecting the tool's movement. The tool will quickly find its way into the casing, because of the conical-shaped end 3. The flange 2, upon striking the upper edge of the casing, will bring the tool to rest, and further movement of the cable and standard stem (not shown) will permit the stem 5 to move with respect to the tool, and will cause the head 14 to pass the hooks 20. The operator knows that the tool, has been received in a casing by noticing the slack in the cable.

A lifting of the stem 5 will now cause the shoulder 15 to swing the jaws 8 into operative position as already described and also cause the shoulder 15 to engage with the catches 7. Further movement will lift the casing with the tool, and in this manner the casing can be removed from the well. In releasing the tool from the casing, the handles 21 are moved so as to swing the jaws into inoperative position. The tool may now again be lowered into the well for removing another section of casing.

Although I have shown and described one embodiment of my invention, it is to be understood that the same is susceptible of various changes, and I reserve the right to employ such changes as may come within the scope of the appended claims.

I claim:

1. A fishing tool comprising a cylindrical-shaped body having an annular outwardly-extending flange at one end and a conical-shaped portion at the other, a lifting stem slidably mounted in said body and having a shoulder fashioned therein, spring actuated catches carried by said body for engaging with said shoulder, and jaws carried by said body and being engageable by said shoulder, when said stem is moved into a predetermined position.

2. A fishing tool comprising a cylindrical-shaped body having an annular outwardly-extending flange at one end and a conical-shaped portion at the other, a lifting stem slidably mounted in said body and having a shoulder fashioned therein, spring actuated catches carried by said body for engaging with said shoulder, jaws carried by said body and being engageable by said shoulder when said stem is moved into a predetermined position, and manually controlled means for swinging said jaws into inoperative position and for releasing said stem from said jaws.

3. A fishing tool comprising a body having gripping jaws and a stem for supporting said body and being slidably mounted in said body for actuating the jaws, said stem being operated to open or close said gripping means or to act as a lifting means for said body.

4. A fishing tool comprising a body, a stem slidably disposed in said body, a stop for limiting the movement of said body into a well casing, jaws pivotally secured to said body, cooperating parts carried by said jaws and said stem for moving said jaws into operative position when said stem is moved outwardly of the casing, and manually controlled means for moving said jaws into inoperative position and for releasing said cooperating parts.

5. A fishing tool comprising a body portion, a stem for supporting the same and being slidably disposed therein, jaws swingably carried by said body, and cooperating parts carried by said jaws and said stem for moving said jaws into operative position when said stem is moved outwardly of said body, said jaws being movable into inoperative position when said stem is moved in the opposite direction.

CHARLES P. HARRIS.